United States Patent [19]
Dubois

[11] Patent Number: 5,231,413
[45] Date of Patent: Jul. 27, 1993

[54] AIRBORNE IFF ANTENNA WITH SWITCHABLE MULTIPLE PATTERNS

[75] Inventor: Serge Dubois, Conflans Ste Honorine, France

[73] Assignee: Thomson-CSF, Puteaux, France

[21] Appl. No.: 721,647

[22] PCT Filed: Dec. 7, 1990

[86] PCT No.: PCT/FR90/00892
§ 371 Date: Aug. 1, 1991
§ 102(e) Date: Aug. 1, 1991

[87] PCT Pub. No.: WO91/09435
PCT Pub. Date: Jun. 27, 1991

[30] Foreign Application Priority Data
Dec. 8, 1989 [FR] France .................. 89 16264

[51] Int. Cl.$^5$ .......................................... H01Q 19/00
[52] U.S. Cl. ............................... 343/833; 343/834; 343/837
[58] Field of Search .............. 343/833, 834, 836, 837, 343/705, 708, 876; 342/360

[56] References Cited
U.S. PATENT DOCUMENTS
3,283,327  11/1966  Stuckey, Jr. et al. ............. 343/834
3,404,396  10/1968  Buehler et al. ................... 343/833

FOREIGN PATENT DOCUMENTS
0021251  1/1981  European Pat. Off. .
0172626  2/1986  European Pat. Off. .
2196527  3/1974  France .
1471860  4/1977  United Kingdom .

OTHER PUBLICATIONS
Patent Abstracts of Japan, vol. 12, No. 440, (E-684), Nov. 18, 1988, & JP A, 63171004, (Nippon Telegr. & Teleph. Corp. (NTT)), Jul. 14, 1988.

Primary Examiner—Rolf Hille
Assistant Examiner—Hoanganh Le
Attorney, Agent, or Firm—Oblon, Spivak, McClelland, Maier & Neustadt

[57] ABSTRACT

An IFF airborne antenna including a single primary radiating element 20 with a plurality of nuisance elements 30, 40, 50 associated with the primary radiating element is disclosed in conjunction with a switching device for switching respective nuisance elements so as to selectively modify the characteristics pattern of the primary radiating element in order to obtain either an omnidirectional pattern corresponding to the pattern of the IFF surveillance mode or a first directional pattern corresponding to the fore directional pattern in the IFF interrogation mode or a second directional pattern corresponding to the monitoring pattern in the IFF interrogation mode. The switching of the nuisance elements makes it possible to selectively obtain the fore directional pattern corresponding either to a first IFF standard (Western standard) on a first frequency band or to a second IFF standard (Eastern standard) on a second frequency band which is different from the first frequency band.

9 Claims, 2 Drawing Sheets

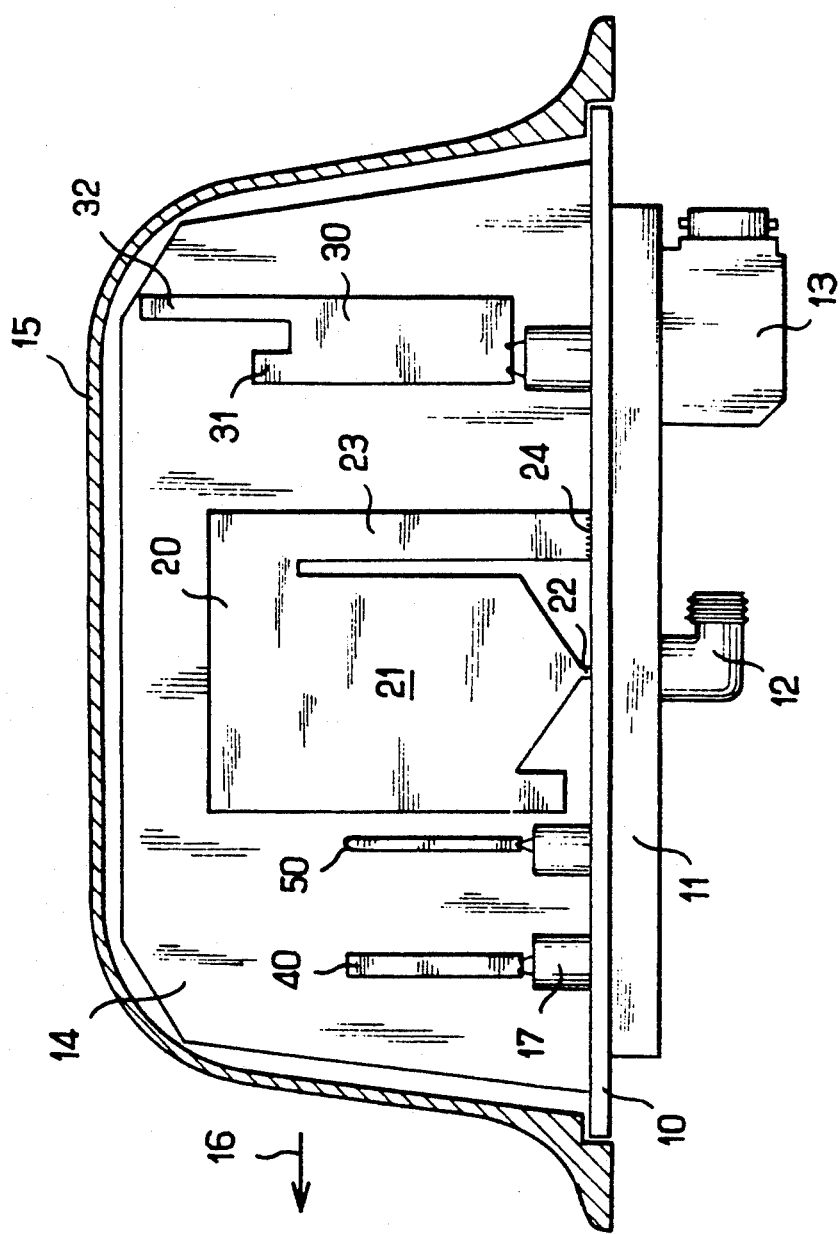

AIRBORNE IFF ANTENNA WITH SWITCHABLE MULTIPLE PATTERNS

BACKGROUND OF THE INVENTION

1. Field of the Invention

The present invention relates to a fixed airborne IFF antenna.

2. Discussion of Background

"Fixed" airborne antenna will be understood to mean a non-orientable antenna fixed onto the fuselage of the aircraft, generally under a flat radome, as opposed to IFF scanning antennas, to which category the antenna of the invention (which seeks moreover to remedy a certain number of disadvantages characteristic of these scanning antennas) does not belong.

The IFF technique (Identification Friend or Foe) operates on two levels: transponder ("surveillance" mode) and interrogator ("challenge" mode).

In the absence of information on the direction of the target to be identified, it is necessary to provide, in "surveillance" mode, omnidirectional coverage, this generally being achieved by means of two radiating elements whose pattern is, in azimuth, omnidirectional, each of the radiating elements ensuring, in elevation, a substantially hemispherical coverage. One of the radiating elements is placed on the back and the other on the belly of the craft.

By contrast, in the interrogation/response phase ("challenge" mode), directional antennas are used whose coverage corresponds approximately to that of the scanning of the radar on board the aircraft. This pattern, called the "fore directional pattern" or "sum pattern ($\Sigma$)" has been represented by $\Sigma$ in FIG. 1 (it will be noted in this respect that "directional" means a pattern which, in contrast to an omnidirectional pattern, favours the fore sector, even if the aperture angle of this pattern is relatively wide, typically of the order of $\pm 50°$, a value corresponding substantially to the scanning sector of the on-board radar). The pattern V corresponds to the omnidirectional surveillance pattern.

The fore directional pattern is obtained with additional antennas, also two in number (back+belly), which are therefore added to the two omnidirectional surveillance antennas.

Moreover, there currently exist two different IFF standards, generally designated by the terms Eastern and Western, which use different frequency bands, respectively 600-700 MHz and 1030/1090 MHz.

Now, although it is known how to produce omnidirectional radiating elements which are bistandard, that is to say which operate equally well in both frequency bands, such is not the case for the radiating elements which make it possible to obtain the fore directional pattern.

Therefore, if it is desired that the aircraft be able to use one and the other standard, it will be necessary to provide a set of directional antennas for each standard, thus bringing to six the total number of antennas required to be able to operate equally well in accordance with both standards.

This is particularly penalising in the case of airborne antennas owing to the very great difficulty in positioning and installing the antennas at appropriate locations on the fuselage.

A first aim of the invention is to avoid this multiplication of antennas, by proposing a single universal antenna making it possible to selectively produce either an (Eastern/Western) omnidirectional pattern, or a Western directional patter, or an Eastern directional pattern.

It will thus be possible to reduce to two (back+belly) the total number of antennas which the craft will have to carry, instead of six.

Another aim of the present invention is to permit improved discrimination of the targets to be identified.

In fact, referring to FIG. 1, it can be seen that the fore directional pattern $\Sigma$ has a certain number of secondary side lobes, so that a close-by target situated in the direction D2 of one of these secondary lobes, hence situated outside the field of the on-board radar and hence invisible to the pilot, will be able to produce, if it is close, a more intense signal than a distant target which might be situated in the direction D1 of the main lobe. In this illustrative case, the pilot will receive the response from the target situated in the direction D2, the target which he does not see, and not that from the target situated in the direction D1 and which will not be discriminated from the other targets.

This disadvantage is least with scanning systems, which use so-called "integrated" antennas placed on the same support as the antenna of the on-board radar and are hence subject to the same mechanical scanning as the latter, or alternatively which use the antenna of the on-board surveillance radar directly (the so-called "cross-band" technique), the interrogation then being carried out in a band (X band) other than the IFF surveillance.

Both these latter techniques are however used less and less, the first downgrading the performance of the radar and posing mechanical problems of bulkiness of the extra antennas added to the antenna of the radar, and the second not being able to be implemented by recent pulse-compression radars.

The only other existing discrimination technique is a technique relying on the use of an additional pattern, the so-called "monitoring pattern" or "difference pattern ($\Delta$)", which is an aft directional pattern such as that illustrated by $\Delta$ in FIG. 1, and of a series of three successive coded pulses P1, P2 and P3 of equal amplitude.

To effect the discrimination, the IFF system will emit the pulses P1 and P3 (the so-called "interrogation" pulses) using the fore directional pattern $\Sigma$ (interrogation pattern or sum pattern), and the pulse P2 (the so-called "monitoring" pulse) with the aft directional pattern $\Delta$ (monitoring pattern or difference pattern).

Thus, in the abovementioned case of the two targets situated in the directions D1 and D2, as regards the target situated in the direction D1, pulses P1 and P3 of higher level than the pulse P2 (since the $\Sigma$ pattern favours the fore direction and the $\Sigma$ pattern penalises this same fore direction) will be received, whereas as regards the target situated in the direction D2, the opposite will be the case.

Thus, by comparing the level of the pulse P2, as perceived through the $\Delta$ pattern, with that of the pulses P1 and P3, as perceived through the $\Sigma$ pattern, it will be possible to neutralise the effect of the secondary lobes of the $\Sigma$ pattern. Generally, only the signals coming from targets for which the level of P2 is at least 9 dB less than that of P1 or P3 are preserved, this corresponding to a given angle of discrimination about the direction D1.

However, such a discrimination technique requires that a third pattern, namely the aft directional pattern $\Delta$ be available in addition to the omnidirectional pattern V and the fore directional pattern $\Sigma$.

On an aircraft this would necessitate the setting up of two additional (back+belly) antennas, or even four additional antennas if it is desired to be able to apply this technique to the two standards, Western and Eastern, thus bringing the total number of antennas to eight or ten respectively.

Such a multiplication of antennas is incompatible with an aircraft, which means that this technique, although very effective, has hitherto been employed only in ground/air identification, and very rarely in air/air identification.

A second aim of the invention is thus to permit, without increasing the number of antennas, which will still be two (back+belly), the use of this technique on board an aircraft, without increasing the number of antennas and without having to resort to a scanning technique.

SUMMARY OF THE INVENTION

To achieve the abovementioned aims, the airborne IFF antenna according to the invention comprises:

a single primary radiating element (20) formed by a wide-band bent-back monopole;

a plurality of nuisance elements (30, 40, 50) associated with this primary radiating element, and switching means (51, 52) connected between each of the nuisance elements and earth, which are able on command to switch each of the elements selectively between an inert state and an earthed state, the electrical and geometric characteristics of the radiating element and of the nuisance elements and the switching commands being such that they selectively modify the characteristic pattern of the primary radiating element so as to obtain:

either an omnidirectional pattern (V) corresponding to the pattern of the IFF surveillance mode, or a first directional pattern corresponding to the fore directional pattern ($\Sigma$) in IFF interrogation mode in accordance with a first IFF standard on a first frequency band, or a second directional pattern corresponding to the fore directional pattern in IFF interrogation mode in accordance with a second IFF standard on a second frequency band different from the first, or a third directional pattern corresponding to the monitoring pattern ($\Delta$) in IFF interrogation mode in accordance with the first IFF standard, or a fourth directional pattern corresponding to the monitoring pattern ($\Delta$) in IFF interrogation mode in accordance with the second IFF standard.

Advantageously, the switching of the nuisance elements makes it possible, for the said first directional pattern and/or the said second directional pattern, to obtain selectively the corresponding fore directional pattern:

either with a first IFF standard on a first frequency band, or with a second IFF standard on a second frequency band different from the first.

According to a certain number of other preferred characteristics:

the nuisance elements comprise a director element and a reflector element;

in the case where the antenna is mounted inside a radome and can operate over two different frequency ranges, the nuisance elements comprise at least one auxiliary nuisance element associated with the primary radiating element and switched so as to selectively correct the degradation, due to the radome effect in at least one of the frequency bands, of the radiation pattern of this primary radiating element;

still in the case where the antenna can operate over two different frequency ranges, one at least of the nuisance elements is a mixed element tuned to one and the other of the two frequency bands;

the switching means comprise, for each of the nuisance elements, a diode mounted between a point of the nuisance element and the earth potential and means for selectively biasing this diode;

in this case, the point of the nuisance element to which the diode is connected in a point of minimum impedance; and in this latter case, the diode is connected to the point closest to a common earth plane, and it is enclosed in a screened enclosure extending between this earth plane and the nuisance element.

BRIEF DESCRIPTION OF THE DRAWINGS

An illustrative embodiment of the invention will now be described with reference to the attached figures.

FIG. 2 is a side view of the antenna of the invention, disposed inside a protective radome seen in cross-section.

FIG. 3 is a cross-sectional, enlarged view of the switching means situated at the base of the nuisance elements of the antenna.

FIG. 4 shows, in cartesian coordinates, the three plotted patterns V, $\Sigma$ and $\Delta$ corresponding to the

DETAILED DESCRIPTION OF THE PREFERRED EMBODIMENTS

Figure 1:
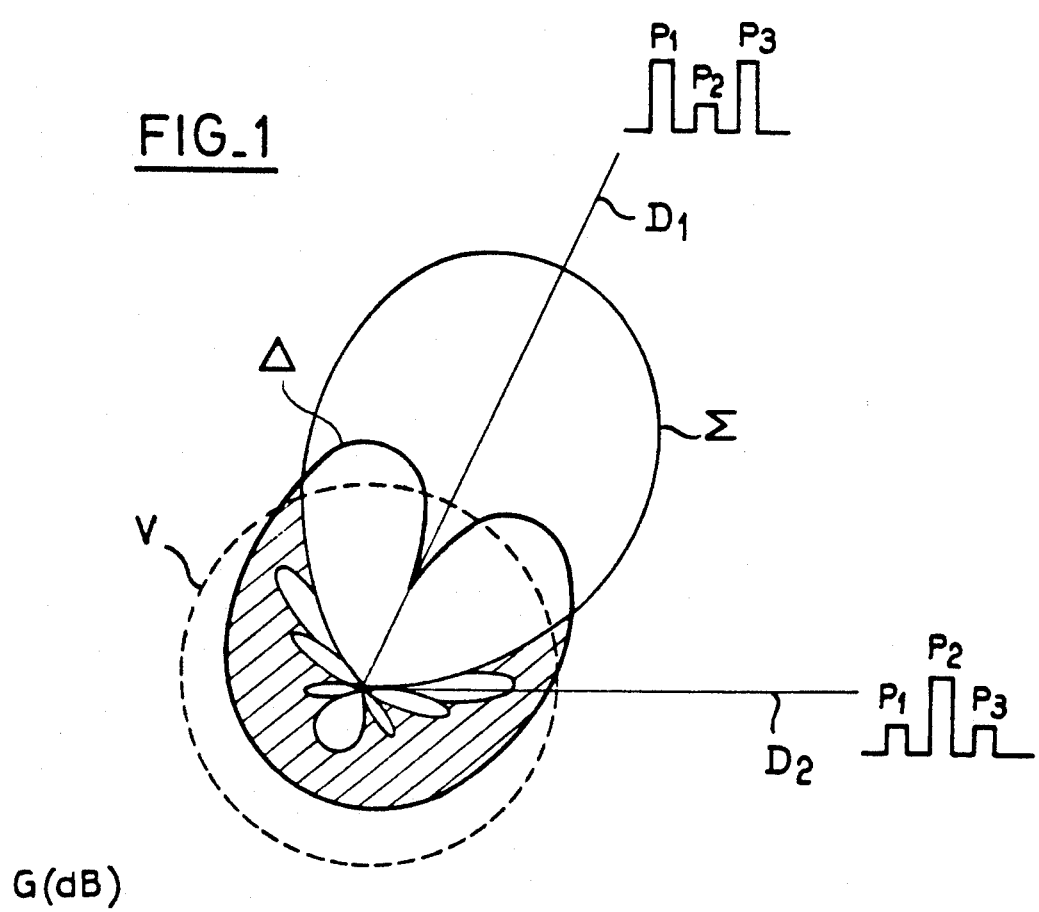
FIG. 1, mentioned above, shows the three patterns V, $\Sigma$ and $\Delta$ required for IFF surveillance, identification and discrimination respectively.

FIG. 2 represents the antenna of the invention. This antenna is mounted on a metal plate 10 constituting, from the mechanical point of view, a footing serving for the mounting of the antenna and of the elements associated with it, and forming, from the radio point of view, a short-circuit plane (earth plane).

Under the footing, a box 11 encloses the various electronic switching circuits (whose role will be disclosed further on) and carries a coaxial connector 12 receiving the signal to be radiated (or delivering the signal picked up), and a connector 13 connected to the network of cables conveying the orders for switching between the various patterns.

The footing 10, which will be screwed into an aperture made in the fuselage of the aircraft, supports a printed board 14 made from insulating material carrying a certain number of metallisations constituting the elements of the antenna. The whole is enclosed in a radome 15, transparent from the radio point of view, and also fixed (screwed) onto the fuselage of the aircraft. The construction of the antenna in plate form (that is to say in the form of metallisation on a printed board) is particularly suited to an airborne application: saving in weight, volume and aerodynamism, in addition to the saving in cost.

The antenna of the invention comprises essentially a radiating element 20 forming a single, primary source with which are associated a certain number of nuisance radiating elements 30, 40, 40 which can be selectively switched between an inert state and an earthed state, depending on the orders conveyed to the connector 13.

The radiating element 20 is a wide-band omnidirectional element so that it is possible to operate equally well on both bands, Western and Eastern. It is constructed in the form of a bent-back monopole comprising a wide main part 21 (typically of the order of λ/8 to λ/10, λ being the average operating wavelength), so that it has a wide frequency band; the part 21 is fed at its base at 22 by the signal to be radiated and prolonged through a bent-back branch 23 connected at 24 to the earth plane 10 (this earthing further permits the accumulation of static charges at the surface of the element to be avoided).

With this active element 20 is associated an aft nuisance element or reflector 30 and a fore nuisance element or director 40 (the fore direction is indicated by the arrow 16).

Figure 4:
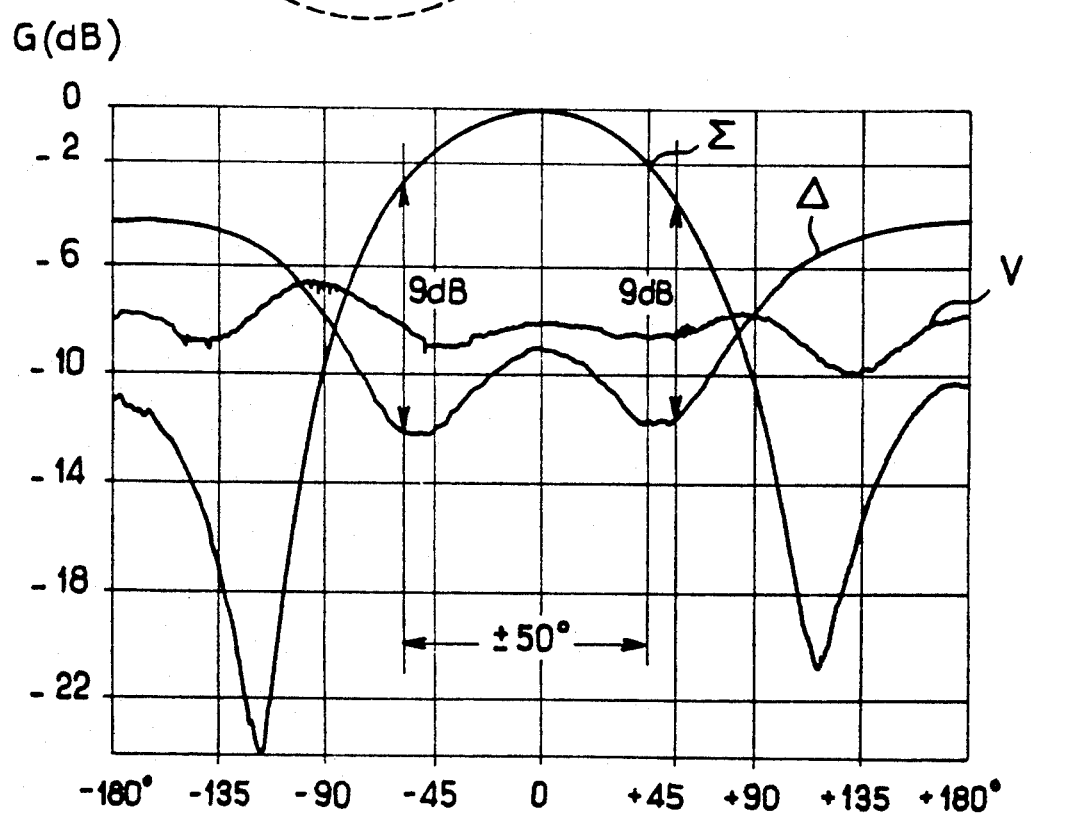

The primary radiating element 20 alone (that is to say when the various nuisance elements are all switched into an inert state) has a practically omnidirectional pattern which permits IFF surveillance to be ensured, as can be seen in the plot V of FIG. 4 (all the plots of this figure are produced at 1,030 MHz).

Bearing in mind the wide band of this radiating element 20, omnidirectionality is ensured just as well on the Western band as on the Eastern band. Nevertheless, in order to compensate the radome effect due to the presence of the close-by dielectric material 15, and the effect of its different incidence in the one and the other of the two bands, an extra switchable element 50 is provided in order to rectify this radome effect in one of the bands (here the Western band) and thus improve the omnidirectionality of the pattern in this band.

The reflector 30, which will be switched to obtain the directional patterns in the two bands, is a mixed element consisting in fact of two wires 31, 32 merged at their base and of different lengths (the shorter wire 31 corresponding to the Western band and the longer wire 32 to the Eastern band), this avoiding recourse to two different separately switched wires.

For its part the direction 40 consists of a simple monopole just like the director 50.

Bearing in mind the relatively large wavelength in the IFF band (of the order of 50 cm), which is incompatible with the required compactness of the antenna (overall dimensions less than 20 cm), the various elements of the antenna have been brought close together. They are therefore very strongly coupled and their dimensions have been calculated bearing this coupling in mind.

The elements 30, 40 and 50 are selectively switched by means of diodes 51 connecting or not connecting them, depending on the applied control voltage +V, to the earth plane 10.

Table I below gives the various switchings to be executed in order to obtain the desired patterns.

TABLE I

| Pattern | Reflector 30 | Director 40 | Director 50 |
|---|---|---|---|
| Omnidirectional (E & W) | 0 | 0 | 1 |
| Eastern fore directional | 1 | 1 | 1 |
| Western fore directional | 1 | 0 | 0 |
| Western monitoring | 1 | 1 | 1 |

(1 = diode conducting;
0 = diode blocked)

With regard to the director 50 which serves, as has been explained above, to compensate the radome effect in the Western band, it has been observed that the fact that this element is or is not switched when operating in Eastern band has practically no consequence on the omnidirectionality of the pattern in this latter band.

Also, in order to reduce the total number of switching configurations, it is envisaged that this direction 50 will still remain switched in the case of an omnidirectional pattern, whether the latter be that of the Western band (where the director 50 has a real effect on the pattern) or that of the Eastern band (where this director is without effect).

It will moreover be noted that no Eastern monitoring pattern is provided, the Eastern IFF standard not making provision to transmit the pulses P1-P2-P3 permitting discrimination by using the two patterns, Σ and Δ.

It would however be possible, perhaps, to obtain without difficulty the required corresponding patterns, by appropriate additional switchings.

Implementation of the invention has required the solving of several problems to do with the switching of the various nuisance elements.

These switching-related problems are manifold:

The switching must firstly be extremely rapid. In fact, when receiving the three pulses P1, P2 and P3, it is necessary to pass very rapidly from the Σ pattern (for transmission of the pulse P1) to the Δ pattern (for transmission of the pulse P2) and then back to the Σ pattern (for transmission of the pulse P3). Typically, the change of pattern should occur in less than 150 ns.

Secondly, the switched power is high: in fact, the peak power at the input of the radiating element 20 can reach 1 kW. The energy accumulated in the nuisance elements may therefore be large, and, at the instant when the latter are earthed, the diode will have to discharge a high number of charges to earth, thus hindering the rapidity of the switching.

The diodes, when they are in a blocked state, should not be unblocked by the high frequency appearing at their terminals (owing to the phenomenon of detection of the high-frequency voltage).

Finally, in aircraft, a difficulty is very frequently encountered related to the fact that the IFF antennas and the UHF communication antennas (decimeter band, generally around 330 MHz) are very close, often only a few tens of centimeters apart. Hence this often results in interference between the second harmonic (660 MHz) of the UHF transmission (330 MHz), which falls in the 600-700 MHz Eastern IFF band and may, depending on the frequencies employed, disturb the IFF reception. In the case of the invention, the switching of the patterns should seek to minimise this problem and prevent the non-linearities, inherent in any switching, generating second harmonics.

To meet these various constraints, a rapid-action PIN diode having low capacitance in reverse mode is firstly chosen for the diode.

Next and most importantly, to take account of the power requirements, instead of siting the diode at the centre of the nuisance element, (which would be the ideal position since it is here that, in the unswitched state, the element would be as short, hence as inert as possible), it is chosen to make the cutout at the base (the end lying next to the earth plane 10) of the nuisance element, since it is at this location that the impedance of the nuisance element is lowest, and hence that the power is lowest.

This way of proceeding permits less powerful, hence more rapid diodes to be employed. Once having sited the cutout for the nuisance element at its base, its height and its distance relative to the main radiating element 20 will be determined in such a way that this nuisance element is inert or active depending on the state of the diode.

As far as the generation of second harmonics is concerned, this generation likewise depends on the position of the diode on the nuisance element. Here again, the optimum position is likewise the location in which the nuisance element exhibits the lowest impedance; hence the attraction of effecting the switching at the base is twofold.

To further reduce the generation of harmonics, the diode is enclosed in an earthed screening, in accordance with a configuration such as that illustrated in FIG. 3: the base 41 of the nuisance element 40 (the latter having been taken merely by way of example, the configuration being the same for the nuisance elements 30 and 50) is connected to the earth plane 10 by the PIN diode 51 enclosed in a tubular housing 17 forming a screen. To bias this diode, the control voltage +V is applied to the base 41 of the nuisance element via a disabling inductance 52, itself enclosed in the screen 17.

I claim:

1. An IFF airborne antenna comprising:
   a single primary radiating element formed by a wide-band bent-back monopole;
   a plurality of nuisance elements proximal to said primary radiating element; and
   switching means connected between each of said nuisance elements and ground wherein said switching means switch each of said nuisance elements selectively between an inert state and a grounded state wherein the electrical and geometric characteristics of said radiating element and of said nuisance elements and the switching of said switching means provide modification of a characteristic pattern of said primary radiating element in order to provide an antenna output which is one of an omnidirectional pattern corresponding to pattern of an IFF surveillance mode, a first directional pattern corresponding to a fore directional pattern in an IFF interrogation mode in accordance with a first IFF standard on a first frequency band, a second directional pattern corresponding to said fore directional pattern in said IFF interrogation mode in accordance with a second IFF standard on a second frequency band which said second frequency band is different from said first frequency band, a third directional pattern corresponding to monitoring pattern in said IFF interrogation mode in accordance with said first IFF standard and a fourth directional pattern corresponding to said monitoring pattern in said IFF interrogation mode in accordance with said second IFF standard.

2. The antenna of claim 1, wherein said nuisance elements comprise a reflector element and a director element.

3. The antenna according to claim 2, characterised in that the reflector element comprises two wires corresponding to the first and second IFF standards respectively.

4. The antenna of any one of claims, 1, 2 or 3 characterised in that, the antenna being mounted inside a radome, the nuisance elements further comprise an auxiliary nuisance element associated with the primary radiating element and switched so as to selectively correct the degradation, due to the radome effect in at least one of the frequency bands, of the radiation pattern of this primary radiating element.

5. The antenna of claim 4, characterised in that the configuration for switching the nuisance elements is given by the following truth table:

| Pattern | Reflector element (30) | Director element (40) | Auxiliary element (50) |
| --- | --- | --- | --- |
| Omnidirectional | 0 | 0 | 1 |
| 1st standard fore directional | 1 | 1 | 1 |
| 2nd standard fore directional | 1 | 0 | 0 |
| 1st standard monitoring | 1 | 1 | 1 |

(1 = earthed state;
0 = inert state).

6. The antenna of claim 1 characterised in that the switching means comprise, for each of the nuisance elements:
   a diode mounted between a point of the nuisance element and the earth potential, and
   means for selectively biasing this diode.

7. The antenna of claim 6, characterised in that the point of the nuisance element to which the diode is connected is a point of minimum impedance.

8. The antenna of claim 7, characterised in that the diode is connected to the point of the nuisance element closest to a common earth plane, and in that the diode is enclosed in a screened enclosure extending between this earth plane and the nuisance element.

9. The antenna according to claim 1, characterised in that the primary element and the nuisance elements are formed by metallisations deposited on a printed board.

* * * * *